United States Patent Office 3,425,863
Patented Feb. 4, 1969

3,425,863
PROCESS FOR IMPARTING ANTISTATIC AND HYDROPHOBIC PROPERTIES TO A SYNTHETIC TEXTILE MATERIAL
Hans-Ludwig Honig, Leverkusen, Günter Kolb, Cologne-Stammheim, and Walter Wunder, Cologne-Flittard, Germany, assignors to Farbenfabriken Bayer Aktiengesellschaft, Leverkusen, Germany, a German corporation
No Drawing. Filed Oct. 20, 1964, Ser. No. 405,227
Claims priority, application Germany, Nov. 8, 1963, F 41,231
U.S. Cl. 117—139.5                                    4 Claims
Int. Cl. C08d 13/24; B44d 1/22

It is known that textile materials can be treated with hydrophobic agents, in aqueous emulsion or in organic solvents, in order to obtain hydrophobic properties. It is also known that the electrostatic charging of textile materials can be prevented by treating them with antistatic agents.

It has not, however, so far been possible to treat a textile material in such a way as to render it both hydrophobic and antistatic, since the hydrophobic effect is greatly impaired by the antistatic agent whilst the antistatic effect is largely eliminated by the hydrophobic agent.

It has now been found possible to simultaneously provide hydrophobic and antistatic properties by combining conventional hydrophobic agents with homo- or copolymers of amino esters of acrylic acid and/or methacrylic acid corresponding to the formula:

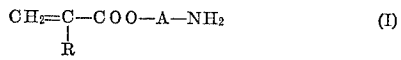

in which R represents a hydrogen atom or methyl group, and A represents a linear or branched, optionally substituted, alkylene group with at least 2 carbon atoms, preferably with 2–10 carbon atoms, or a

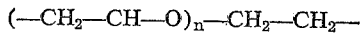

group in which $n$ represents a number from 1 to 20, expediently in the form of their salts, the said alkylene groups can be substituted, for example, by methyl, ethyl, and propyl.

In this context, copolymers of amino esters corresponding to Formula I are those which contain, in the polymerized form, at least 25% by weight of units derived from monomers corresponding to the above general formula.

The following are examples of monomers corresponding to Formula I: 2-amoinoetyhl acrylate and -methacrylate, 2-aminopropyl acrylate and -methacrylate, 3-aminopropyl acrylate and -methacrylate, 4-aminobutyl acrylate and -methacrylate, 5-aminopentyl acrylate and -methacrylate, aminoethoxy ethyl acrylate and -methacrylate.

Compounds of Formula I in which the radical A contains 2–10 carbon atoms, exhibit particular utility. Preference is given to polymers or their salts of monomers of Formula I in which A represents a linear or branched alkylene radical with 2 to 5 carbon atoms.

Any monomers which can be copolymerized with these amino esters may, in principle, be considered as copolymerization components, examples include vinyl aromatic compounds such as styrene, vinyltoluene, halogenated, in particular chlorinated hydrocarbons such as vinyl chloride, vinylidene chloride, heterocyclic vinyl compounds such as vinyl pyridine, vinyl pyrrolidene, vinylesters such as vinyl acetate, vinyl propionate vinyl chloracetate, derivatives of acrylate acid and/or methacrylic acid such as esters with aliphatic alcohols containing up to 18 carbon atoms, amides such as acrylamide, methacrylamide, N-methyl methacrylamide or nitriles such as acrylo nitrile, methacrylo nitrile, conjugated diolefines such as butadiene, isoprene and α-monoolefine hydrocarbons such as ethylene, propylene.

Preferred are copolymers in which the comonomer component copolymerized with the amino esters of Formula I wholly or partial comprises a compound which imparts hydrophilic properties to the copolymer, i.e. a copolymerizable compound with a —COOH, —OH or —CONH$_2$ or related group (e.g. —CONHCH$_3$). By the term "hydrophilic monomers" are understood compounds which have a water solubility of at least 2%, e.g. acrylic acid and methacrylic acid, amides of acrylic acid and methacrylic acid, hydroxyesters of acrylic and methacrylic acids such as 2-hydroxy-ethyl-acrylate, 2-hydroxy-ethyl-methacrylate, vinyl pyrrolidone and vinyl pyridine.

Inorganic and organic monobasic or polybasic acids, for example, hydrochloric acid, sulphuric acid, acetic acid, oxalic acid or tartaric acid, may be considered for the salt formation with the amino groups of the polymer.

In principle the aforementioned monomers may be polymerized by known methods, e.g. by block, solution, emulsion or even suspension polymerization. Both water-soluble and also monomer-soluble inorganic or organic peroxy compounds, such as potassium peroxydisulphate, dibenzoylperoxide or cumene hydroperoxide as well as radical forming azo compounds, such as azodiisobutyronitrile, may be employed as polymerization catalysts. Similarly, Redox-system may be used to influence the molecular weight. Suitable methods are described in Houben Weyl, Methoden der Organischen Chemie, 4. Auflage, Band 14/1.

The following are mentioned as examples of hydrophobic agents: organic polysiloxanes, such as dimethyl polysiloxane and hydrogen methyl polysiloxane or paraffin wax emulsions, such as described in Belgian Patent 610,354, optionally in combination with metal salts, such as zirconium acetate, zirconium oxychloride or aluminum triformate. Also suitable for use as hydrophobic agents are oleophobic agents such as described in British Patent 933,512, such as perfluorinated carboxylic acids, optionally in the form of their Werner complexes, of perfluorinated polymers based on polyacrylic acid esters.

The combination of a hydrophobic agent and polymers of amino esters of acrylic acid and/or methacrylic acid is applied by processes normally employed for the finishing of textiles. The fibre is impregnated with the mixture and is then squeezed out until it contains the desired amount, dried and is subjected to an after-treatment, should the hydrophobing agent necessitate such treatment. The ratio of hydrophobic agent to the polymers of amino esters of acrylic acid and/or methacrylic acid may vary within wide limits, and is dependent upon the textile materials to be treated and upon the special effect which is intended to be obtained. It is expendient, depending upon the textile material, to apply a layer of 0.1 to 20 parts by weight of polymers of amino esters of acrylic acid or methacrylic acid and to use the hydrophobic agent in the usual quantities, preferably 1–5% by weight based on the textile material.

The above procedure is particularly applicable to textile materials which are known from experience to be prone to acqurie an electrostatic charge, that is to say products made from fully synthetic fibres, such as those based on polyamides, polyacrylonitrile, polyterephthalic esters, polypropylene or polyurethanes.

Surprisingly, it has been found that, by using the combination according to the invention of hydrophobic agents and polymers of amino esters of acrylic acid and/or methacrylic acid, it is possible to obtain textile materials with outstanding hydrophobic and, at the same time, antistatic properties. To a large extent, they exhibit an improved resistance to pilling and are less susceptible to soiling while being pleasant to handle an exhibit other advantageous properties.

Example 1

A fabric of polyacrylonitrile fibres is impregnated with a solution containing 75 g. per litre of a 20% dimethyl polysiloxane emulsion containing zirconium salt, 5 g. per litre of a 20% hydrogen methyl polysiloxane emulsion and 1.2 g. of poly-β-aminoethyl methacrylate hydrochloride. After impregnation, the fabric is squeezed out until it contains 100% residual moisture, is dried at 100° C. and then heated for 5 minutes at 140° C. The rain test by Dr. Bundesmann's method and determination of the surface resistivity (Log R) gave the following values:

Water absorption: 6.2% and satisfactory water-repellency
Surface resistivity (Log R): 9.9

If the polymerization product of β-aminoethyl methacrylate hydrochloride is replaced by a conventional antistatic agent, for example a product based on a substituted fatty acid amide, the water absorption rises to 27.5% and the surface resistivity (Log R) to 12.8.

Example 2

A polyamide fabric is impregnated with a solution containing 75 g. per litre of a 20% dimethyl polysiloxane emulsion containing zirconium salt, 5 g. per litre of a 20% hydrogen methyl polysiloxane emulsion and 4.8 g. per litre of poly-β-aminoethyl methacrylate hydrochloride. After drying at 100° C. and then heating for 4 minutes at 140° C., the following values were determined:

Water absorption: 9.1%
Surface resistivity (Log R): 10.0

If, on the other hand, the polyamino ester is replaced by a conventional antistatic agent, for example the amine salt of a high molecular weight phosphoric acid ester, the water absorption rises to 32.3% and the surface resistivity (Log R) to 13.

Example 3

A polyester fabric is impregnated with a solution containing 160 g. per litre of a 20% paraffin wax emulsion containing zirconium salt and 1.8 g. per litre of poly-β-aminoethyl methacrylate hydrochloride. After drying at 100° C. and then heating at 140° C., the water absorption is 15% and the surface resistivity (Log R) 9.0.

Example 4

A fabric fo polyacrylonitrile fibres is impregnated with a solution containing 75 g. per litre of a 20% dimethyl polysiloxane emulsion containing zirconium salt, 5 g. per litre of a 20% hydrogen methyl polysiloxane emulsion and 10 g. per litre of a 25% aqueous solution of a copolymer of 80% by weight of β-aminoethyl methacrylate hydrochloride and 20% by weight of β-hydroxypropyl methacrylate. After drying at 100° C. and then heating at 140° C., the water absorption is 8.3% and the surface resistivity (Log R) 9.9.

Example 5

A fabric of polyacrylonitrile fibres is impregnated with a solution containing 75 g. per litre of a 20% dimethyl polysiloxane emulsion containing zirconium salt, 5 g. per litre of a 20% hydrogen methyl polysiloxane emulsion and 15 g. per litre of a 30% aqueous emulsion of a copolymer of 30% by weight β-aminoethyl methacrylate hydrochloride, 20% by weight methyl methacrylate and 50% by weight ethyl acrylate. After drying at 100° C. and then heating at 140° C., the water absorption is 6.8% and the surface resistivity (Log R) 10.1.

What we claim is:

1. A process for finishing synthetic textiles prone to acquiring an electrostatic charge comprising impregnating the textiles with an active amount of a mixture of a hydrophobic agent and polymers of a salt of a primary amino ester of a compound of the formula

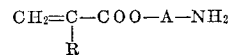

wherein R is defined as a member selected from the group consisting of hydrogen and methyl; A is a member selected from the group consisting of: (1) an alkylene group of 2–10 carbon atoms, and (2)

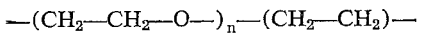

in which $n$ is an integer of 1–20; and thereafter drying and heating the treated textiles to effect setting.

2. The process of claim 1 wherein the polymers are copolymers containing at least 25% by weight of aminoesters with copolymerizable monomers containing a member selected from the group consisting of —COOH, —OH and —CONH₂ and exhibiting a minimum solubility in water of 2%.

3. The process of claim 1 wherein A is an alkylene group having 2–5 carbon atoms.

4. The process of claim 1 wherein the hydrophobic agent is a member selected from the group consisting of silicone oil, paraffin wax emulsion and an oleophobic agent.

References Cited

UNITED STATES PATENTS

| | | | |
|---|---|---|---|
| 2,138,763 | 11/1938 | Graves | 117—139.5 X |
| 2,597,614 | 5/1952 | Brown et al. | 117—161 X |
| 2,917,409 | 12/1959 | Green | 117—141 X |
| 3,078,185 | 2/1963 | Kine et al. | 117—141 |

FOREIGN PATENTS

| | | |
|---|---|---|
| 863,748 | 3/1961 | Great Britain. |

WILLIAM D. MARTIN, *Primary Examiner.*

THEODORE G. DAVIS, *Assistant Examiner.*

U.S. Cl. X.R.

117—135.5, 138.8, 161; 252—8.8, 8.9